US007832422B2

(12) United States Patent
Endoh et al.

(10) Patent No.: US 7,832,422 B2
(45) Date of Patent: Nov. 16, 2010

(54) VALVE

(75) Inventors: Tadao Endoh, Kuki (JP); Akihiro Kimura, Bandou (JP)

(73) Assignee: Kyosan Denki Co., Ltd., Koga (JP)

( * ) Notice: Subject to any disclaimer, the term of this patent is extended or adjusted under 35 U.S.C. 154(b) by 163 days.

(21) Appl. No.: 11/808,346

(22) Filed: Jun. 8, 2007

(65) Prior Publication Data

US 2008/0042092 A1 Feb. 21, 2008

(30) Foreign Application Priority Data

Jun. 13, 2006 (JP) ............................. 2006-162974
Apr. 18, 2007 (JP) ............................. 2007-108851

(51) Int. Cl.
*F16K 15/00* (2006.01)

(52) U.S. Cl. ........................ 137/540; 251/337; 267/179

(58) Field of Classification Search ................. 251/337; 267/170, 272, 286, 64.15, 166.1, 167, 166, 267/174, 178, 179; 137/493.8, 543.19, 565.15, 137/590, 540, 543.17
See application file for complete search history.

(56) References Cited

U.S. PATENT DOCUMENTS 380,651 A * 4/1888 Waldorf ................... 267/166.1
1,751,261 A * 3/1930 Wilson .................... 267/166.1
3,662,950 A 5/1972 McIntosh et al.
4,162,064 A * 7/1979 Bouton et al. ............... 267/177
4,377,280 A * 3/1983 Wienand et al. ............ 267/180
4,993,376 A * 2/1991 Fukutome et al. ......... 123/90.65
5,246,215 A 9/1993 Takamura et al.
5,477,829 A 12/1995 Hassinger et al.
5,794,657 A * 8/1998 Oberg ................... 137/543.19
6,938,641 B2 * 9/2005 Abe ........................ 137/515.5
6,959,694 B2 * 11/2005 Kieferle et al. .............. 123/446
2003/0172973 A1 9/2003 Abe
2005/0218572 A1 10/2005 Soga et al.

FOREIGN PATENT DOCUMENTS

FR 2 318 349 A1 2/1977
JP A 56-46128 4/1981
JP A 8-320074 12/1996

* cited by examiner

*Primary Examiner*—Stephen Hepperle
*Assistant Examiner*—Macade Brown
(74) *Attorney, Agent, or Firm*—Oliff & Berridge, PLC

(57) ABSTRACT

A valve includes a valve element; a valve seat; a coil spring; and a spring bearing portion. The coil spring, provided between the valve element and the spring bearing portion, presses the valve element toward the valve seat. An effective upper winding end of the coil spring and an effective lower winding end of the coil spring are offset from each other by 180 degrees in a plan view.

16 Claims, 11 Drawing Sheets

F I G . 4
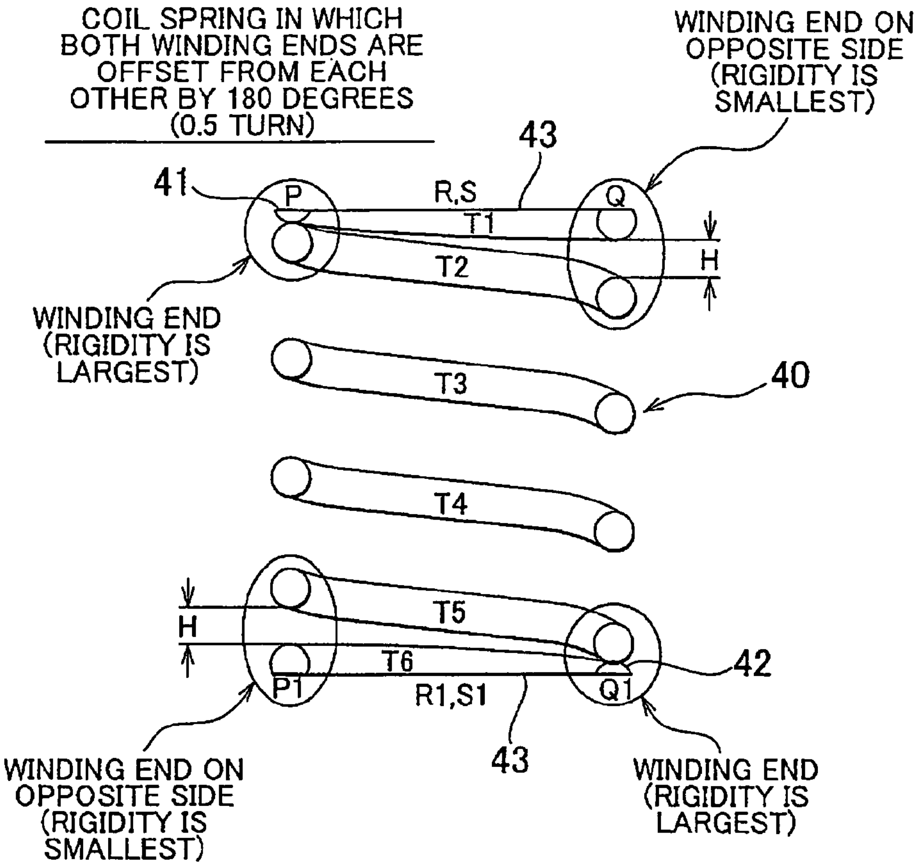

VALVE

INCORPORATION BY REFERENCE

The disclosure of Japanese Patent Applications No. 2006-162974 filed on Jun. 13, 2006 and 2007-108851 filed on Apr. 18, 2007 including the specification, drawings and abstract are incorporated herein by reference in their entirety.

BACKGROUND OF THE INVENTION

1. Field of the Invention

The invention relates to a coil spring of a valve, in particular, a coil spring of a valve that is provided in a passage through which fluid is delivered from a tank by a pump, and that adjusts the pressure of the fluid, for example, a valve that adjusts the pressure of fuel supplied from a fuel tank to the injector of an internal combustion engine by a fuel pump.

2. Description of the Related Art

A fuel supply system of a vehicle or the like, which is a system for supplying fluid, includes a fuel passage 5 that connects a fuel tank 1, a fuel pump 2, and the injectors 6 of an engine, as shown in FIG. 17. The fuel in the fuel tank 1 is supplied to the injectors 6 of the engine via filters 3 and 4 by the fuel pump 2 provided in the fuel tank 1. In this case, the pressure of the fuel in the fuel passage 5 fluctuates according to, for example, the operating state of the engine. Therefore, a pressure adjusting valve 8, which adjusts the pressure of the fuel to a predetermined value, is provided in the fuel supply system. The pressure adjusting valve 8 is provided in a branch passage 7 that extends from the fuel passage 5. When the pressure in the fuel supply system is equal to or above the predetermined value, the pressure adjusting valve 8 is opened to return the fuel to the fuel tank 1.

FIG. 16 shows an example of a conventional pressure adjusting valve 10. The pressure adjusting valve 10 includes a case 11, a valve element 14, and a coil spring 16. The case 11 is a member that forms the framework of the pressure adjusting valve 10. The case 11 includes a fuel inlet 12, and a fuel outlet 13. A valve seat 18 is formed near the fuel inlet 12 on the inner surface of the case 11. A spring bearing portion 17 is formed in the bottom portion of the case 11.

The valve element 14 includes a cylindrical portion 15. The valve element 14 is moved upward and downward in the case 11 while the cylindrical portion 15 is moved along the inner surface of the case 11. The coil spring 16 is provided between the inner bottom surface of the valve element 14 and the spring bearing portion 17. The coil spring 16 constantly presses the valve element 14 toward the fuel inlet 12 so that the end of the valve element 14 contacts the valve seat 18, and communication between the fuel supply system and the fuel tank 1 is interrupted. However, when the pressure of the fuel in the fuel supply system is equal to or above the predetermined value, the coil spring 16 is pressed downward by the valve element 14. As a result, the valve element 14 is moved away from the valve seat 18, and accordingly, excess fuel is returned into the fuel tank 1. In the pressure adjusting valve 10, the cylindrical portion 15, which is moved along the inner surface of the case 11, is provided. Therefore, the axis of the valve element 14 is not deviated from the axis of the valve seat 18, and appropriate sealing is provided between the valve element 14 and the valve seat 18. On the other band, the axis of the valve element 14 is slightly inclined due to fit dimension tolerance and shape tolerance. Accordingly, the valve element 14 is not moved smoothly. As a result, the pressure of the fuel at a valve opening time differs from the pressure of the fuel at a valve closing time. Also, the fit portion, which is moved along the inner surface of the case, needs to be formed with high dimension accuracy. This increases the cost (refer to Japanese Patent Application Publication No. 8-320074 (JP-A-8-320074).

To solve such a problem, for example, a poppet valve, which includes a conic valve element as shown in FIG. 1, is available. In the poppet valve, the valve element 34 does not include a member that is moved along the inner surface of a case, and the valve element 34 is supported by a coil spring 40. When the valve element 34 opens a fuel inlet, the valve element 34 is supported by one end of the coil spring 40 such that the valve element 34 is floated. Also, when the valve element 34 closes the fuel inlet, the coil spring 40 makes the valve element 34 contact a valve seat 31*b*.

In such a poppet valve, the valve element has a conical shape. Even if the axis of the valve element is slightly deviated or inclined with respect to the axis of the seat valve when the valve element contacts the valve seat to close the fuel inlet, appropriate sealing is provided. Thus, although measures are taken, for example, so that the quality of the material of the coil spring is uniform, and the entire coil spring has a uniform diameter, no particular consideration has been given to a measure to be taken so that a load is uniformly applied to the entire circumference of the coil spring when the coil spring extends or contracts. For example, no particular consideration has been given to how the upper and lower effective winding ends in the upper side and lower side of the coil spring should be arranged in the plan view. Accordingly, when the conventional coil spring extends or contracts, the axis of the coil spring tends to be deviated or inclined with respect to the axis of the valve seat.

In recent years, it has become necessary to more accurately control the supply of fuel in a vehicle or the like. Accordingly, it has become necessary to more accurately adjust the pressure of the fuel using the pressure adjusting valve. However, as described above, the axis of the conventional coil spring tends to be deviated or inclined with respect to the axis of the valve seat when the conventional coil spring extends or contracts. If the axis of the coil spring is deviated or inclined with respect to the axis of the valve seat when the coil spring extends or contracts, the axis of the valve element is also deviated or inclined with respect to the axis of the valve seat when the valve element opens or closes the fuel inlet. If the axis of the valve element is deviated or inclined, for example, the pressure of the fuel when the valve element opens the fuel inlet differs from the pressure of the fuel when the valve element closes the fuel inlet, or appropriate sealing is not provided between the valve element and the valve seat. As a result, it is not possible to sufficiently satisfy the need of accurately adjusting the pressure of the fuel.

SUMMARY OF THE INVENTION

It is an object of the invention to provide a valve in which the characteristic of a load is uniform on the entire circumference of a coil spring in a plan view.

To achieve the above-described object, the following configurations are employed according to the invention.

According to a first aspect of the invention, a valve includes a valve element, a valve seat, a coil spring, and a spring bearing portion. The coil spring, provided between the valve element and the spring bearing portion, presses the valve element toward the valve seat. An effective upper winding end of the coil spring and an effective lower winding end of the coil spring are offset from each other by 180 degrees in a plan view.

According to a second aspect of the invention, in the valve according to the first aspect, when the valve element is moved in a movement range, adjacent winding portions of the coil spring may be provided not to contact each other.

According to a third aspect of the invention, in the valve according to the second or first aspect, the coil spring includes a first winding portion that contacts the valve element, a second winding portion that is continuous with the first winding portion, a third winding portion that contacts the spring bearing portion, and a fourth winding portion that is continuous with the third winding portion. When the valve element is moved in the movement range, positions of the effective upper winding end and the effective lower winding end may be maintained by disposing the first winding portion and the second winding portion such that the first winding portion and the second winding portion do not contact each other, and by disposing the third winding portion, and the fourth winding portion such that the third winding portion and the fourth winding portion do not contact each other.

According to a fourth aspect of the invention, in the valve according to the first or second aspect, the coil spring includes a first winding portion that contacts the valve element, a second winding portion that is continuous with the first winding portion, a third winding portion that contacts the spring bearing portion, and a fourth winding portion that is continuous with the third winding portion. The first winding portion and the second winding portion may be disposed such that a clearance between the first winding portion and the second winding portion is maintained when the valve element is moved in a movement range, and the third winding portion and the fourth winding portion may be disposed such that a clearance between the third winding portion and the fourth winding portion is maintained when the valve element is moved in the movement range.

According to a fifth aspect of the invention, in the valve according to the third or fourth aspect, the valve may has a first spacer disposed between the first winding portion and the second winding portion, and/or a second spacer disposed between the third winding portion and the fourth winding portion.

According to a sixth aspect of the invention, in the valve according to any one of the first to fourth aspects, the coil spring may include an open-end constant-pitch spring, an upper support member that is attached to an upper-end winding portion of the open-end constant-pitch spring, and a lower support member that is attached to a lower-end winding portion of the open-end constant-pitch spring. The upper support member and the lower support member are opposite to each other through the open-end constant-pitch spring, and an upper spiral surface is formed on a surface of the upper support member, and a lower spiral surface is formed on a surface of the lower support member, the surface of the upper support member and the surface of the lower support member being opposite to each other. There is a distance equivalent to a pitch of the open-end constant-pitch spring between a start portion of the upper spiral surface and a portion of the upper spiral surface, which is at a same position as the start portion of the upper spiral surface in the plan view. There is the distance equivalent to the pitch of the open-end constant-pitch spring between a start portion of the lower spiral surface and a portion of the lower spiral surface, which is at a same position as the start portion of the lower spiral surface in the plan view. The upper spiral surface receives the upper-end winding portion of the open-end constant-pitch spring, and the lower spiral surface receives the lower-end winding portion of the open-end constant-pitch spring.

According to a seventh aspect of the invention, in the valve according to the sixth aspect, an upper protrusion may be formed in the upper support member such that the upper protrusion extends in parallel with the upper spiral surface, and there is a distance shorter than the pitch between the upper protrusion and the upper spiral surface; and a lower protrusion may be formed in the lower support member such that the lower protrusion extends in parallel with the lower spiral surface, and there is the distance shorter than the pitch between the lower protrusion and the lower spiral surface.

According to an eighth aspect of the invention, in the valve according to any one of the first to the sixth aspects, the coil spring may be an open-end constant-pitch spring that has a rectangular cross section that has a long side extending in an axial direction of the coil spring, and a short side extending in a radial direction of the coil spring, and a flat surface portion may be formed in each of the upper-end winding portion and the lower-end winding portion.

According to a ninth aspect of the invention, in the valve according to any one of the first to the sixth aspects, the coil spring may be formed by forming a spiral opening that has a constant pitch on an outer periphery of a spring steel pipe.

According to a tenth aspect of the invention, in the valve according to any one of the first to the ninth aspects, the valve may be disposed in a passage through which fluid is delivered from a tank by a pump. When a pressure of the fluid in the passage is equal to or lower than a predetermined value, the valve element contacts the valve seat to close the passage, and when the pressure of the fluid is higher than the predetermined value, the valve element is moved away from the valve seat to open the passage.

According to an eleventh aspect of the invention, in the valve according to any one of the first to the tenth aspects, the valve is used in a fuel system of a vehicle.

With this configuration, the characteristic of a load is made substantially uniform on the circumference of the valve in the plan view. Thus, the valve element of the valve is maintained in a perpendicular position. Therefore, when the valve element is moved in the movement range to adjust the pressure of the fluid, the axis of the valve element remains substantially the same as the axis of the inlet for the fluid.

According to the aspects of the invention, an effective upper winding end and an effective lower winding end are offset from each other by 180 degrees in a plan view. Therefore, the load applied from the valve element is made substantially uniform on the entire circumference of the coil spring in the plan view. Thus, the valve element of the valve is maintained in the perpendicular position. Therefore, when the valve element is moved in the movement range, the axis of the valve element remains substantially the same as the axis of the inlet for the fluid. Also, it is possible to reduce the difference between the pressure of the fuel at a valve opening time and the pressure of the fuel at a valve closing time, and to improve the sealing performance at the valve closing time. Further, a member which is moved along the inner surface of the case of the valve does not need to be formed in the valve element with high dimension accuracy. This decreases the production cost.

BRIEF DESCRIPTION OF THE DRAWINGS

The foregoing and further objects, features and advantages of the invention will become apparent from the following description of preferred embodiments with reference to the accompanying drawings, wherein like numerals are used to represent like elements and wherein:

FIG. 4 is a cross sectional view taken along the line IV-IV in FIG. 3;

DETAILED DESCRIPTION OF THE EXAMPLE EMBODIMENTS

Figure 1:
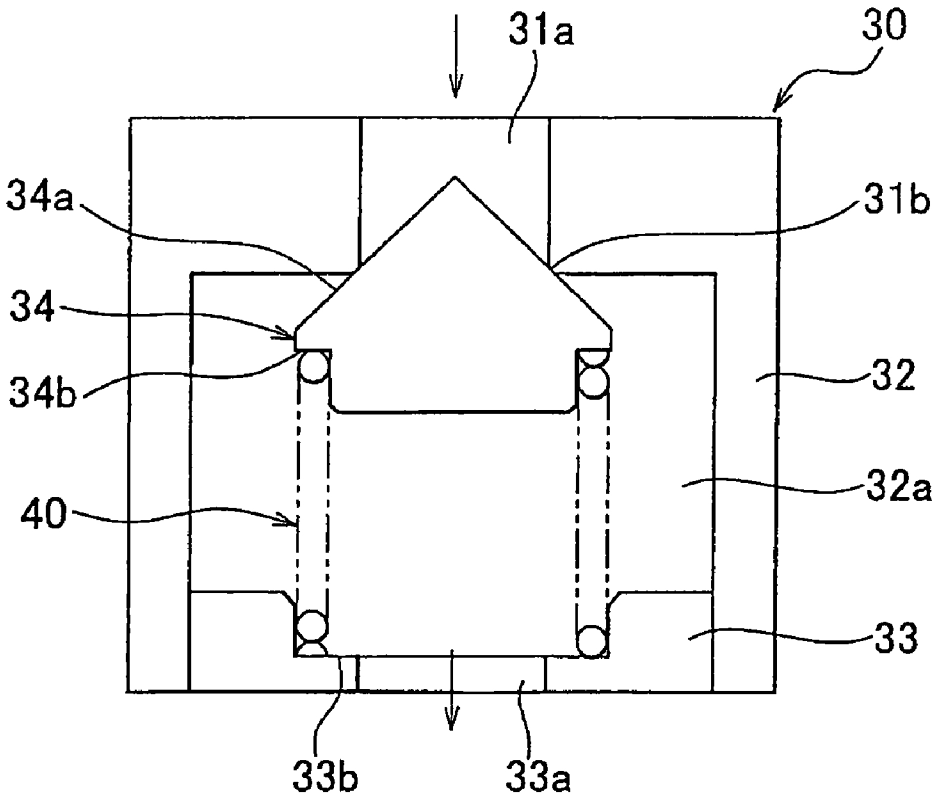
FIG. 1 is a cross sectional view of a pressure adjusting valve according to the invention.
Figure 2:
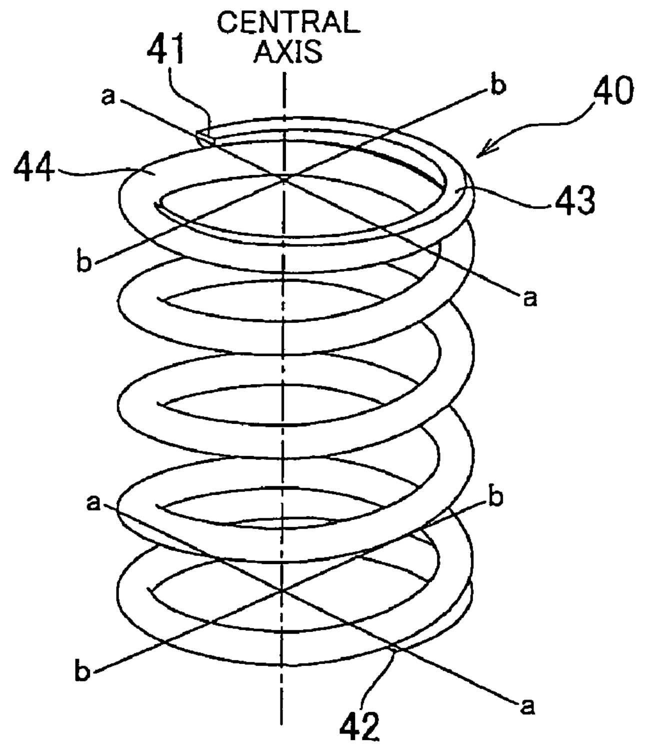
FIG. 2 is a perspective view of a coil spring according to the invention, in which upper and lower effective winding ends are offset from each other by 180 degrees (0.5 turn), when the coil spring is set.
Figure 3:
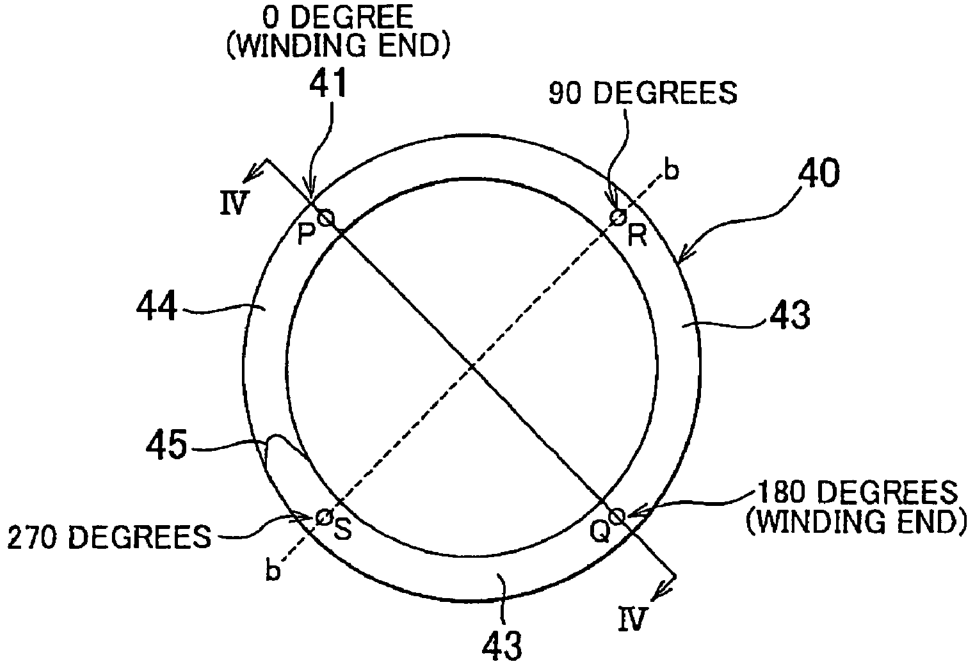
FIG. 3 is a plan view of the coil spring according to the invention, in which upper and lower effective winding ends are offset from each other by 180 degrees, when the coil spring is set.
Figure 5:
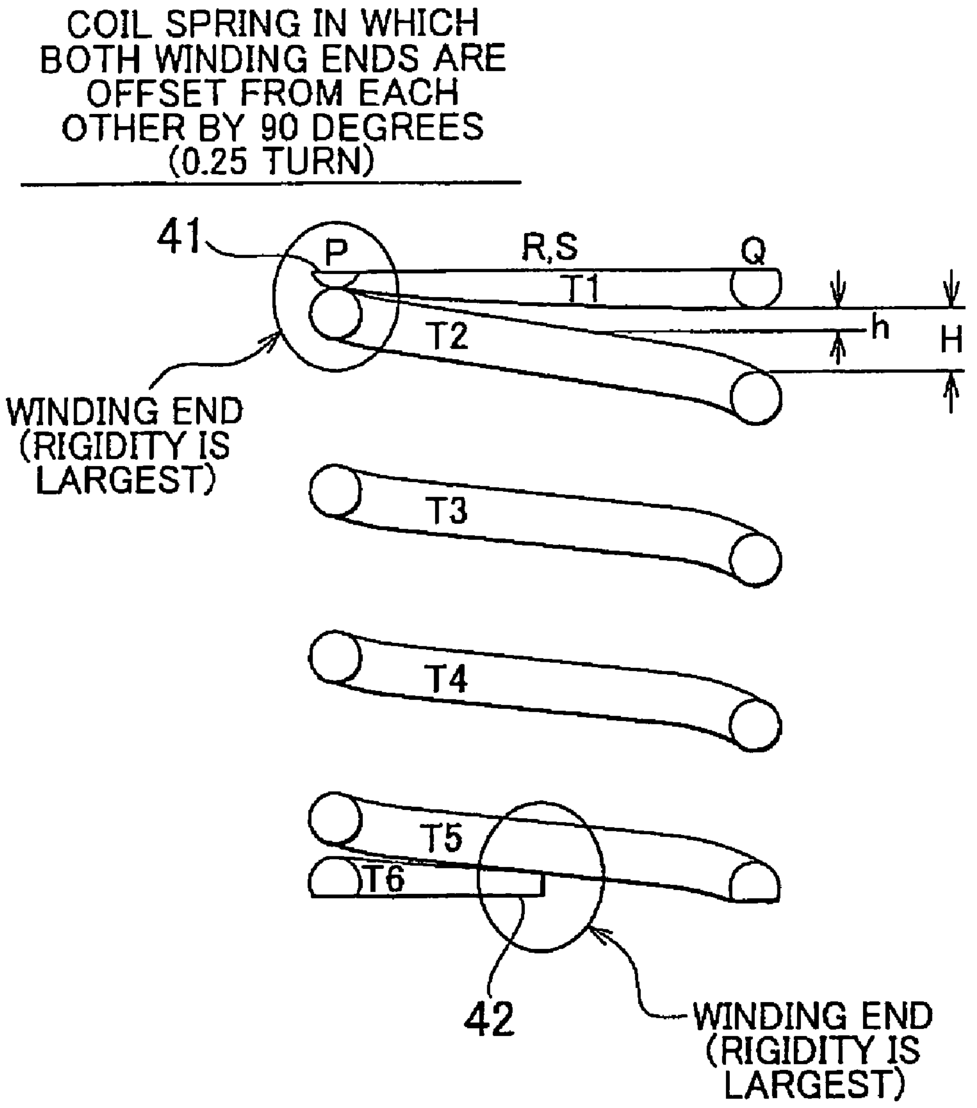
FIG. 5 is a cross sectional view of a coil spring in which upper and lower effective winding ends are offset from each other by 90 degrees (0.25 turn), when the coil spring is set.

FIG. 1 shows a pressure adjusting valve that includes a coil spring according to a first embodiment of the invention. FIG. 2 is a perspective view of the coil spring according to the first embodiment, in which an upper effective winding end and a lower effective winding end are offset from each other by 180 degrees (i.e., by 0.5 turn), according to the first embodiment. FIG. 3 is a plan view of the coil spring. FIG. 4 is a cross sectional view taken along the line IV-IV in FIG. 3. FIG. 5 is a cross sectional view of a coil spring in which a lower effective winding end is offset from an upper effective winding end by 90 degrees (0.25 turn), in comparison with the coil spring shown in FIG. 4.

Figure 17:
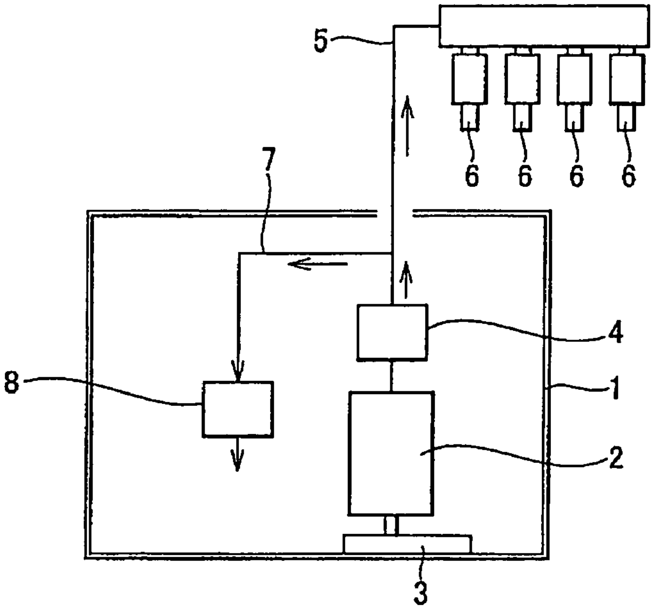
FIG. 17 is a schematic diagram showing a fuel supply system of a vehicle.

The pressure adjusting valve 30 according to the first embodiment is denoted by reference numeral 8 in FIG. 17. The pressure adjusting valve 8 is disposed in the fuel tank 1 such that the pressure adjusting valve 8 is communicated with the fuel passage 5 that connects the fuel pump 2 to the injectors 6 of the engine. For example, the pressure adjusting valve 8 returns excess fuel into the fuel tank 1, and appropriately adjusts the pressure of the fuel supplied to the injectors 6 to a predetermined value.

The pressure adjusting valve 30 includes a case 32, a spring bearing portion 33, the valve element 34, and the coil spring 40. The case 32 is a hollow member in which a space 32*a* is formed. An opening is formed in the top of the case 32, and an opening is formed in the bottom of the case 32. A fuel inlet 31*a* is formed at the end of the hollow portion of the case 32. A valve seat 31*b*, which has a truncated conical shape, is formed in the inner periphery of the lower end portion of the fuel inlet 31*a*. The fuel in the fuel supply system is supplied to the space 32*a* through the fuel inlet 31*a*, as shown by the arrow.

The spring bearing portion 33 is attached to the inner peripheral surface of the lower portion of the case 32 by pressure. A fuel outlet 33*a* is formed in the center portion of the spring bearing portion 33. The excess fuel in the fuel supply system is returned to the fuel tank 1 through the fuel outlet 33*a* as shown by the arrow. A step portion 33*b* is formed in the inner bottom surface of the spring bearing portion 33 to surround the fuel outlet 33*a*. The step portion 33*b* supports the coil spring 40.

The valve element 34 is a poppet valve, and has a conical portion 34*a* at the end of the valve element 34. The conical portion 34*a* faces the valve seat 31*b* that has a substantially truncated conical shape. When the pressure adjusting valve 30 is closed, the valve element 34 contacts the valve seat 31*b*. Because the surface of the conical portion 34*a* has a conical shape, even if the axis of the valve element 34 is slightly deviated with respect to the axis of the valve seat 31*b*, appropriate scaling is provided between the valve element 34 and the valve seat 31*b*.

The coil spring 40 will be described. The coil spring 40 is a known spring formed by winding a rod-like member, which has a substantially uniform diameter, in a coil state. The upper end surface and the lower end surface are horizontal and parallel to each other. Thus, a flat surface portion is formed on each of the upper end surface and the lower end surface. More specifically, as shown in FIG. 4, the coil spring 40 includes a first winding portion T1 a second winding portion T2, a third winding portion T3, a fourth winding portion T4, a fifth winding portion T5, and a sixth winding portion T6 in a direction from the upper portion to the lower portion of the coil spring 40. The first winding portion T1 includes the upper winding end 41. The sixth winding portion T6 includes the lower winding end 42. In the coil spring 40, the first winding portion T1 that is an upper-end winding portion is bent toward the second winding portion T2 so that the upper winding end 41 of the first winding portion T1 is positioned near the second winding portion T2, or the upper winding end 41 contacts the second winding portion T2. In addition, the upper surface of the first winding portion T1 is ground to be horizontal. Thus, the flat surface portion is formed on the upper surface of the first winding portion T1. Similarly, the sixth winding portion T6 that is a lower-end winding portion is bent toward the fifth winding portion T5 so that the lower winding end 42 of the sixth winding portion T6 is positioned near the fifth winding portion T5, or the lower winding end 42 contacts the fifth winding portion T5. In addition, the lower surface of the sixth winding portion T6 is ground to be horizontal. Thus, the flat surface portion is formed on the lower surface of the sixth winding portion T6.

FIG. 3 shows a plan view of the coil spring 40. In FIG. 3, a border between the horizontal surface, which is the flat surface portion, and an arc surface is denoted by reference numeral 45. In FIG. 3, a large area between the upper winding end 41 and the border 45, which is positioned on the right side, shows the horizontal surface 43 that has been ground. A small area between the border 45 and the upper winding end 41, which is positioned on the left side, shows the arc surface 44 that has not been ground. FIG. 4 is a cross sectional view taken along the line IV-IV in FIG. 3. The line IV-IV in FIG. 3 is equivalent to the line a-a in FIG. 2. The line b-b is orthogonal to the line IV-IV in FIG. 3, and the line b-b in FIG. 3 is equivalent to the line b-b in FIG 2.

The coil spring 40 is disposed between the step portion 34*b* of the valve element 34 and the step portion 33*b* of the spring bearing portion 33. When the pressure of the fuel in the fuel passage is equal to or lower than the predetermined value, the coil spring 40 makes the valve element 34 contact the valve seat 31*b* to prevent the fuel in the fuel passage from returning into the fuel tank 1. When the pressure of the fuel in the fuel passage is higher than the predetermined value, the coil spring 40 is pressed, and the valve element 34 is moved away from the valve seat 31*b* while the valve element 34 resists the spring force of the coil spring 40. Thus, the excess fuel in the fuel passage returns into the fuel tank 1. When the pressure adjusting valve 30 is opened, the valve element 34 is supported by one end of the coil spring 40 (i.e., the sixth winding portion T6 in FIG. 4, which is the lower-end winding portion) such that the valve element 34 is floated. The valve element 34 is moved in an extremely narrow movement range, for example, the movement range of 0 to approximately 0.3 mm.

Figure 6A:
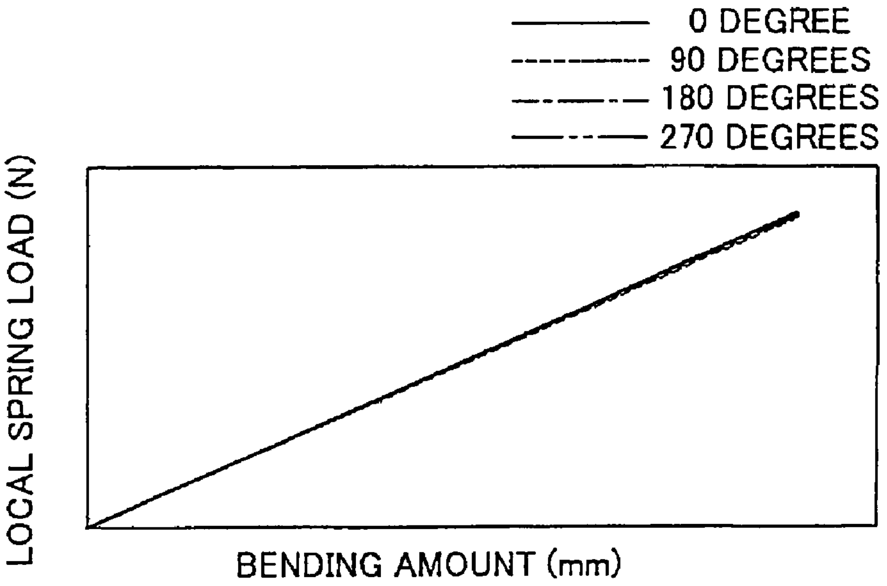
FIG. 6A is a diagram showing the characteristic of the coil spring according to the invention.
Figure 6B:
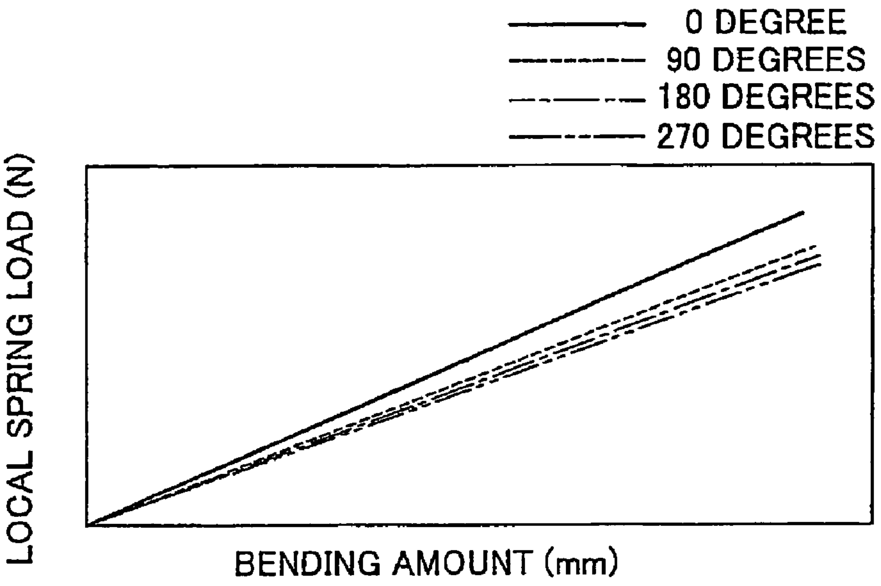
FIG. 6B is a diagram showing the characteristic of the coil spring shown in FIG. 5.

No particular consideration has been given to the positional relation between the upper effective winding end as referred to P of T2, and the lower effective winding end as referred to Q1 of T5. An experiment was conducted on rigidities at point P (i.e., 0-degree position with respect to the winding end), point R (i.e., 90-degree position with respect to the winding end), point Q (i.e., 180-degree position with respect to the winding end), and point S (i.e., 270-degree position with respect to the winding end) in FIG. 3, with respect to the bending amount of the coil spring. In this experiment, the coil spring shown in FIG. 5 was used. In the coil spring shown in FIG. 5, the upper effective winding end as referred to P of T2 and the lower effective winding end as referred to Q1 of T5 are offset from each other, for example, by 90 degrees, i.e., by 0.25 turn in the clockwise direction. As a result, it was found that the rigidities at the points differ from each other, as shown in FIG. 6B.

Figure 7:
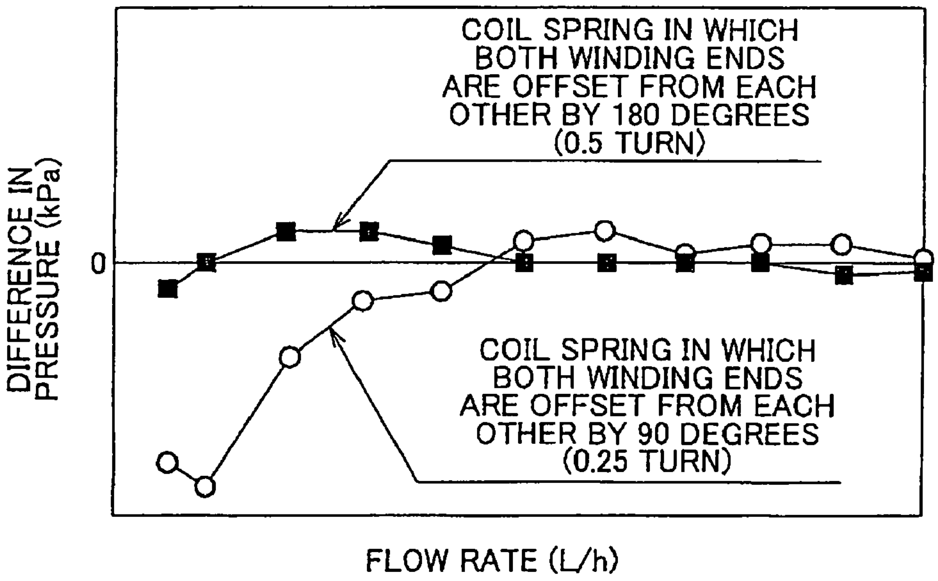
FIG. 7 is a comparative diagram showing differences in the pressure of fuel when the coil spring according to the invention is used, and when the coil spring shown in FIG. 5 is used.

The reasons why the rigidities at the points differ from each other are considered to be as follows. In FIG. 5, the distance between the first winding portion T1 and the second winding portion T2 is approximately zero at point P, "h" at point R (or point S), and "H" at point Q. The distance "H" is longer than the distance "h". Thus, the distance between the first winding portion T1 and the second winding portion T2 is shortest at point P of T2 at which the first winding portion T1 contacts the second winding portion T2, and the upper effective winding end is positioned. The distance between the fifth winding portion T5 and the sixth winding portion T6 is shortest at point Q1 of T5 at which the fifth winding portion T5 contacts the sixth winding portion T6, and the lower effective winding end is positioned. Therefore, when the coil spring is pressed, the rigidity at point P and point R1 is larger than the rigidity at any other point. Thus, when the valve element 34 is moved upward or downward, the axis of the valve element 34 is deviated or inclined with respect to the axis of the valve seat 31*b*. As a result, the pressure of the fuel at a valve opening time differs from the pressure of the fuel at a valve closing time, as shown in FIG. 7 described later. Accordingly, the pressure of the fuel cannot be appropriately adjusted.

In the coil spring 40 according to one embodiment of the invention, the upper effective winding end as referred to P of T2 and the lower effective winding end as referred to Q1 of T5 are offset from each other by 180 degrees in the plan view, as shown in FIG. 4. Because the upper effective winding end as referred to P of T2 and the lower effective winding end as referred to Q1 of T5 are opposite to each other in the radial direction in the plan view, a load is substantially uniformly applied to the circumference of the coil spring 40 in the plan view. In FIG. 4, the distance between the first winding portion T1 and the second winding portion T2 is substantially zero at point P of T2 at which the upper effective winding end is positioned, and the rigidity of the first winding portion T1 and the second winding portion T2 is largest at point P. The distance between the first winding portion T1 and the second winding portion T2 is "H" and longest at point Q that is opposite to point P, and the rigidity of the first winding portion T1 and the second winding portion T2 is smallest at point Q. The distance between the fifth winding portion T5 and the sixth winding portion T6 is substantially zero at point Q1 of T5 at which the lower effective winding end is positioned, and the rigidity of the fifth winding portion T5 and the sixth winding portion T6 is largest at point Q1. The distance between the fifth winding portion T5 and the sixth winding portion T6 is "H" and longest at point P1 that is opposite to point Q1, and the rigidity of the fifth winding portion T5 and the sixth winding portion T6 is smallest at point Q1.

Thus, because the upper effective winding end as referred to P of T2 and the lower effective winding end as referred to Q1 of T5 are offset from each other by 180 degrees in the plan view, the rigidity of the coil spring 40 in the axial direction at point P is substantially the same as the rigidity of the coil spring 40 in the axial direction at point Q, although the rigidity of the upper portion (the first winding portion T1 and the second winding portion T2) is larger than the rigidity of the lower portion (the fifth winding portion T5 and the sixth winding portion T6) at point P, while the rigidity of the upper portion is smaller than the rigidity of the lower portion at point Q. Further, the distance between the first winding portion T1 and the second winding portion T2 at point R is substantially the same as the distance between the first winding portion T1 and the second winding portion T2 at point S. The distance between the fifth winding portion T5 and the sixth winding portion T6 at point R1 is substantially the same as the distance between the fifth winding portion T5 and the sixth winding portion T6 at point S1. Therefore, the rigidity of the coil spring 40 in the axial direction at point R is substantially the same as the rigidity of the coil spring 40 in the axial direction at point S. FIG. 6A shows the result of the experiment conducted using the coil spring 40 according to the first embodiment That is, FIG. 6A shows a change in the spring load at each of points P, R, Q, and S in accordance with the bending amount. As shown in FIG. 6A, the characteristic of the spring load at each of points P, R, Q, and S is substantially uniform.

FIG. 7 shows experimental data showing that the difference between the pressure of the fuel at the valve opening time and the pressure of the fuel at the valve closing time (i.e. hysteresis characteristics) is reduced. In FIG. 7, the horizontal axis indicates the flow rate of the fuel, and the vertical axis indicates the difference between the pressure of the fuel at the valve opening time and the pressure of the fuel at the valve closing time. When using the coil spring in which the upper effective winding end and the lower effective winding end are offset from each other by 90 degrees, the pressure of the fuel at the valve opening time greatly differs from the pressure of the fuel at the valve closing time, as shown by the circles in FIG. 7. In contrast, when using the coil spring 40 according to the first embodiment, in which the upper effective winding end and the lower effective winding end are offset from each other by 180 degrees, the difference between the pressure of the fuel at the valve opening time and the pressure of the fuel at the valve closing time is reduced to substantially zero, as shown by the squares in FIG. 7. By using the coil spring 40 according to the first embodiment, the valve element 34 is moved upward and downward along the axis of the valve seat 31*b*. As a result, it is possible to reduce the difference between the pressure of the fuel at the valve opening time and the pressure of the fuel at the valve closing time, and appropriately adjust the pressure of the fuel.

The above-described coil spring 40 is a so-called "closed-end coil spring" in which the upper winding end 41 contacts the second winding portion T2. Similarly, the lower winding end 42 contacts the fifth winding portion T5. Hereinafter, however, the first winding portion T1 and the second winding portion T2 will be mainly described. In such a closed-end coil spring, the first winding portion T1 is a region that does not have a spring action, and supports the valve element 34 (i.e., a region called "a turn-end"). The region of the coil spring 40 between the position at which the first winding portion T1 contacts the second winding portion T2, and the position at which the fifth winding portion T5 contacts the sixth winding portion T6 has a spring action. The position at which the first winding portion T1 contacts the second winding portion T2 is regarded as "an effective upper winding end", and the position at which the fifth winding portion T5 contacts the sixth winding portion T6 is regarded as "an effective lower winding end". Thus, the region between the effective upper winding end and the effective lower winding end is regarded as "an effective winding region". The upper winding end 41 is positioned above the effective upper winding end. In the plan view, the effective upper winding end and the upper winding end 41 are at the same position.

The action of the closed-end coil spring will be described with reference to FIGS. 15A to 15C. After the valve element 34 is set, the lower surface of the upper winding end 41 contacts the upper surface of the second winding portion T2. Similarly, the upper surface of the lower winding end 42 contacts the lower surface of the fifth winding portion T5. However, hereinafter, the first winding portion T1 and the second winding portion T2 will be mainly described. When the valve element 34 is operated, the coil spring 40 is pressed downward, and the pitch is decreased. The clearance between the first winding portion T1 and the second winding portion T2 changes as shown in FIGS. 15A to 15C.

Figure 15:
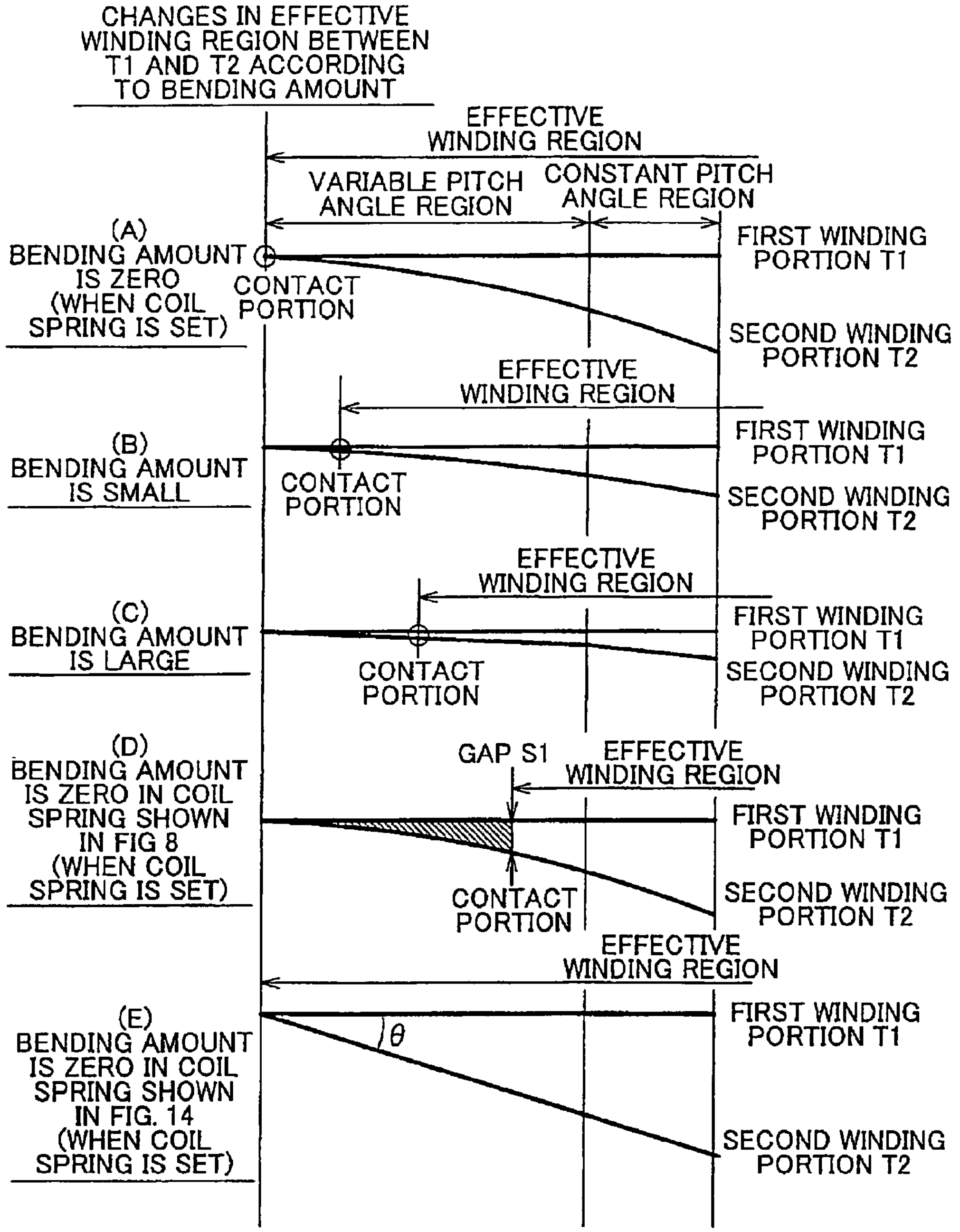
FIGS. 15A to 15E are diagrams showing changes in an effective winding region between a first winding portion T1 and a second winding portion T2 in accordance with a bending amount, according to the invention.
Figure 16:
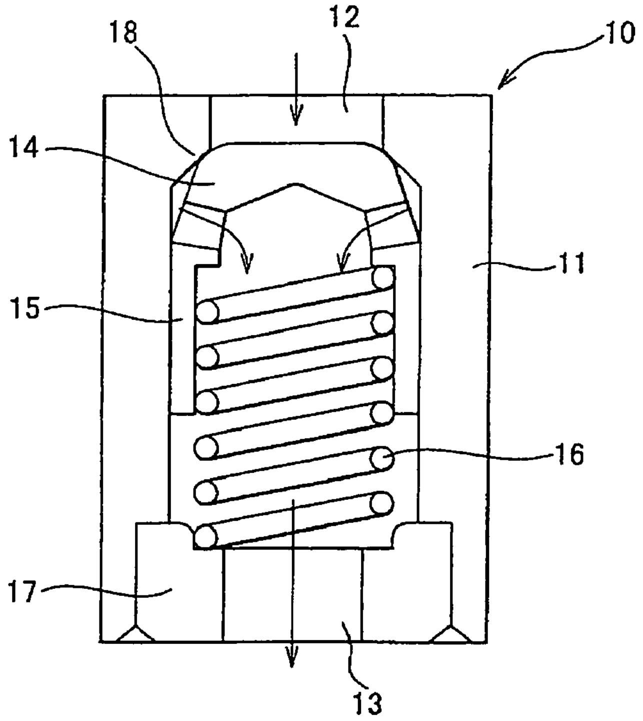
FIG. 16 is a cross sectional view of a conventional pressure adjusting valve.

FIGS. 15A to 15C show changes in the effective winding region between the first winding portion T1 and the second winding portion T2. FIG. 15A shows the state of the coil spring 40 when the coil spring 40 is set and the bending amount is zero. FIG. 15B shows the state of the coil spring 40 when the bending amount is small. FIG. 15C shows the state of the coil spring 40 when the bending amount is large. In FIG. 15A in which the bending amount is zero, the contact portion where the upper winding end 41 contacts the second winding portion T2, i.e., the effective upper winding end is at the leftmost position, and the entire region on the right side of the contact portion is the effective winding region. In this case, the effective winding region extends to the contact portion where the fifth winding portion T5 contacts the sixth winding portion T6. There are a variable pitch angle region and a constant pitch angle region between the upper winding end 41 and the second winding portion T2.

When the valve element 34 is slightly moved downward, that is, when the state of the coil spring 40 is changed from the state shown in FIG. 15A to the state shown in FIG. 15B, both of the clearance in the variable pitch angle region and the clearance in the constant pitch angle region are reduced. As a result, the contact portion moves rightward, and the effective winding region is reduced. When the valve element 34 is further moved downward, that is, when the state of the coil spring is changed from the state shown in FIG. 15B to the state shown in FIG. 15C, both of the clearance in the variable pitch angle region and the clearance in the constant pitch angle region are further reduced. As a result, the contact portion is further moved rightward, and the effective winding region is further reduced Thus, the load is unevenly applied to the coil spring 40, and the axis of the valve element 34 is deviated with respect to the axis of the valve seat 31*b*.

Even if the coil springs 40 are formed to satisfy the above-described condition, it is difficult to set all the coil springs 40 in the same state in the valve elements 34. Thus, the position of the contact portion may vary among the products, and accordingly accuracy may vary among the products. Hereinafter, embodiments in which such a problem is prevented will be described.

The above-described problem is caused because the contact portions, i.e., the positions of the effective upper and lower winding ends are moved, and the effective winding region is reduced. In the embodiments described below, attention is focused on the effective upper and lower winding ends. That is, the effective upper and lower winding ends are offset from each other by 180 degrees in the plan view. In addition, the effective upper and lower winding ends are prevented from moving, to prevent the decrease in the effective winding region of the coil spring 40 when the valve element 34 is operated. Thus, the invention may be applied not only to the closed-end coil spring, but also to a so-called open end constant-pitch spring that is an open-end spring with a constant pitch.

Figure 8:
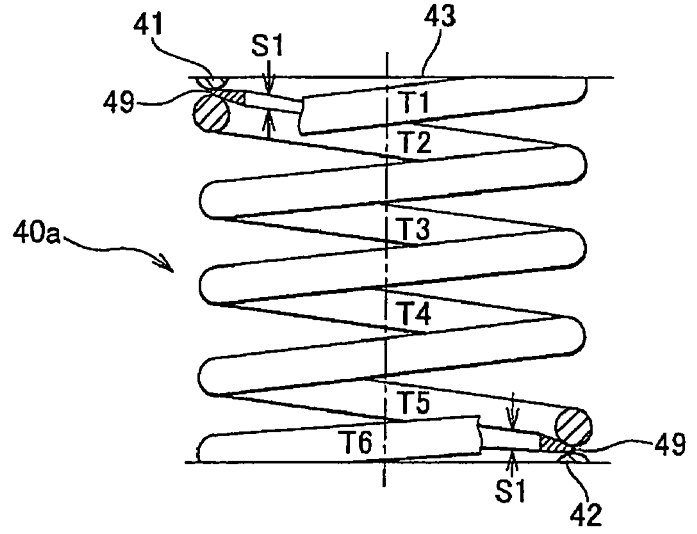
FIG. 8 is a partial cross sectional view of a coil spring according to the invention, in which effective upper and lower winding ends are offset from each other by 180 degrees.

FIG. 8 shows a coil spring 40*a* that is a closed-end coil spring, as well as the coil spring 40 shown in FIG. 2. In the coil spring 40*a,* wedge-shaped spacers 49 are fixed by brazing, welding, or the like between the first winding portion T1, which is the turn-end, and the second winding portion T2, and between the sixth winding portion T6, which is the turn-end, and the fifth winding portion T5. Each spacer 49 has the largest thickness S1. The position at which the upper spacer 49 has the largest thickness S1 is offset from the position at which the lower spacer 49 has the largest thickness S1 by 180 degrees in the plan view. That is, in this case, the position at which the upper spacer 49 has the largest thickness S1 is the position of the effective upper winding end, and the position at which the lower spacer 49 has the largest thickness S1 is the position of the effective lower winding end. At each of the positions, there is a gap S1. As a result, even if the coil spring 40*a* is deformed when the valve element 34 is operated, the adjacent winding portions between the effective upper and lower winding ends do not contact each other, and the effective upper and lower winding ends are not moved.

FIG. 15D shows the state of the coil spring 40*a*. As shown in FIG. 15D, because the wedge-shaped spacer 49 is provided between the first winding portion T1 and the second winding portion T2, the gap S1, which is equal to the largest thickness of the spacer 49, is formed. The positions of the gaps S1 are regarded as the positions of the contact portions. That is, the positions of the gaps S1 are the positions of the effective upper and lower winding ends. As a result, the adjacent winding portions between the effective upper and lower winding ends do not contact each other, and therefore, the effective winding region is not changed when the valve element 34 is operated. This makes it possible to obtain the desired effect of accurately adjusting the pressure of the fuel.

Figure 9:
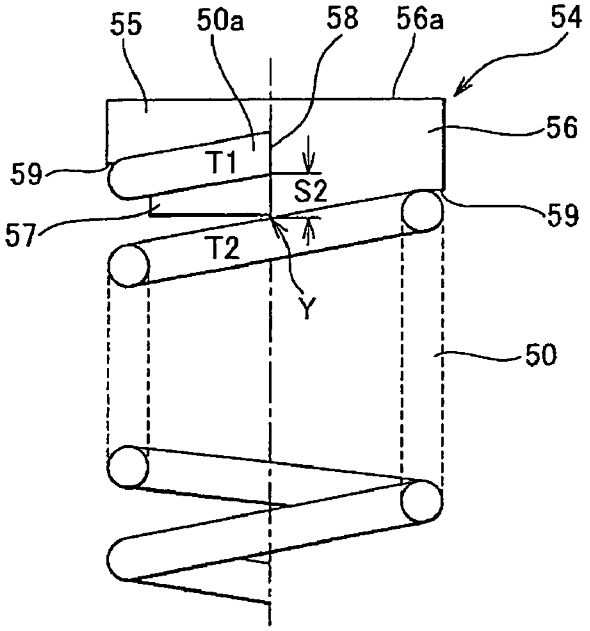
FIG. 9 is a partial cross sectional view of another coil spring according to the invention, in which effective upper and lower winding ends are offset from each other by 180 degrees.

FIG. 9 shows a third embodiment in which the so-called open-end constant-pitch spring is used. In this embodiment, a coil spring unit 54 is used. The coil spring unit 54 includes one coil spring 50 and two support members 55. The coil spring unit 54 may be regarded as "the coil spring". Although FIG. 9 shows only the upper end portion of the coil spring unit 54, the lower end portion of the coil spring unit 54 is similar to the upper end portion.

Figure 10A:
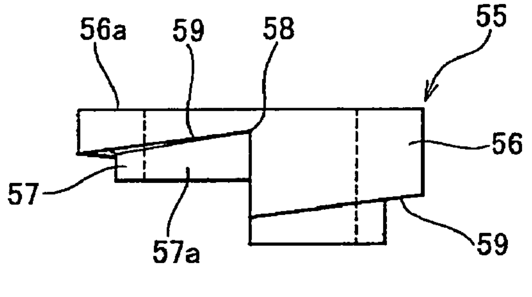
FIG 10A is a front view of a support member shown in FIG. 9.
Figure 10B:
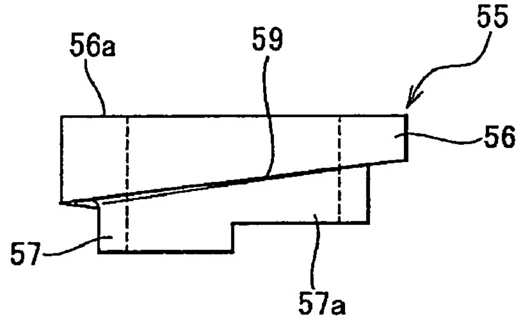
FIG 10B is a rear view of the support member shown in FIG. 9.

The coil spring 50 is the so-called open-end constant-pitch spring. FIG. 10A is a front view of the support member 55. FIG. 10B is a rear view of the support member 55. The support member 55 is made of metal or resin. The support member 55 includes a flange portion 56 at the upper end, and a column portion 57 at the lower end. A horizontal flat surface portion 56*a* is formed on the upper surface of the flange portion 56. A spiral surface 59 is formed on the lower surface of the flange portion 56, as shown in FIGS. 9 and 10A and 10B. The spiral surface 59 has a predetermined length (substantially the same length as that of the first winding portion T1 in FIG. 9), and extends downward from an upper start portion 58. There is a distance equivalent to the pitch of the coil spring 50 between the start portion 58 of the spiral surface 59 and a portion of the spiral surface 59, which is at the same position as the start portion 58 in the plan view.

The column portion 57 is a cylindrical member including a hollow portion 57*a*. The hollow portion 57*a* extends from the top of the column portion 57 to the bottom of the column portion 57. The outer periphery of the column portion 57 is fitted in the inner periphery of the coil spring 50. The first winding portion T1 is fitted to the column portion 57 such that the upper winding end 50*a* of the coil spring 50 contacts the start portion 58. In this case, each of the first winding portion T1 and the lower-end winding portion is used as a supported portion that is supported by the support member 55. When the coil spring unit 54 is used, the valve element 34 is fitted in the hollow portion 57*a* that extends from the top to the bottom of the column portion 57. The valve element 34 may be integrally formed on the upper surface of the support member 55. With this configuration, it is possible to reduce the number of components, and the number of man-hours required in an assembly process.

In this embodiment, the position of each of the upper and lower effective winding ends is the position of the border between the region of the coil spring 50 that closely contacts the spiral surface 59 and the region of the coil spring 50 that does not closely contact the spiral surface 59, that is, the position shown by the arrow Y in FIG. 9. That is, in this embodiment, the positions of the effective upper and lower winding ends Y are offset from each other by 180 degrees in the plan view. As a result, a gap S2 is formed at the position of the effective upper winding end Y as shown in FIG. 9, and at the position, which is offset from the effective upper winding end Y by 180 degrees in the plan view, of the effective lower winding end, a gap is also formed. Thus, even if the coil spring 50 is deformed when the valve element 34 is operated, the adjacent winding portions between the effective upper and lower winding ends do not contact each other, and the positions of the effective upper and lower winding ends are not moved. Therefore, it is possible to obtain the desired effect of accurately adjusting the pressure of the fuel. In this embodiment, the upper winding end 50*a* and the lower winding end (not shown) may be, or may not be offset from each other by 180 degrees in the plan view.

Figure 11:
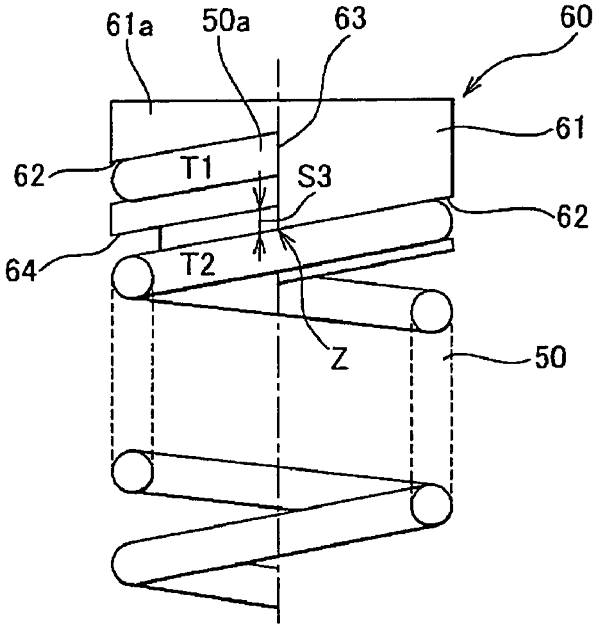
FIG. 11 is a partial cross sectional view of another coil spring according to the invention, in which effective upper and lower winding ends are offset from each other by 180 degrees.

FIG. 11 shows a fourth embodiment in which the so-called open-end constant-pitch spring is used, as in the third embodiment shown in FIG. 9. In the fourth embodiment, a coil spring unit 60 is used. The coil spring unit 60 includes one coil spring 50 and two support members 61. The coil spring unit 60 may be regarded as "the coil spring". Although FIG. 11 shows only the upper end portion of the coil spring unit 60, the lower end portion of the coil spring unit 60 is similar to the upper end portion.

Figure 12A:
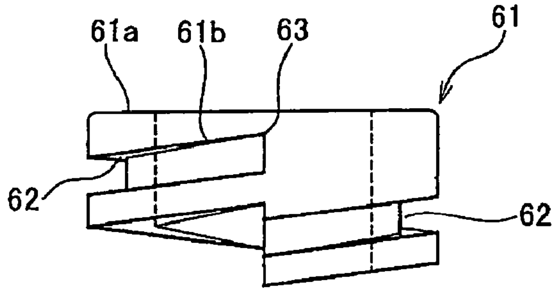
FIG. 12A is a front view of a support member shown in FIG. 11.
Figure 12B:
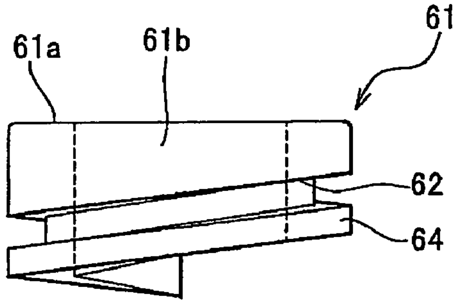
FIG. 12B is a rear view of the support member shown in FIG. 11.

The coil spring 50 is the same as the coil spring 50 shown in FIG. 9, that is, the coil spring 50 is the so-called open-end constant pitch spring. FIG. 12A is a front view of the support member 61. FIG. 12B is a rear view of the support member 61. The support member 61 is made of metal or resin. The support member 61 having a columnar shape includes a hollow portion 61*b* that extends from the top to the bottom of the support member 61. A horizontal flat source portion 61*a* is formed on the upper surface of the support member 61. A spiral surface 62 is formed along the outer periphery of the support member 61. The spiral surface 62 has a predetermined length (substantially the same length as that of the first winding portion T1 in FIG. 11), and extends downward from an upper start portion 63.

As shown in FIG. 11, a protrusion 64 is formed to extend along a circumferential direction, and in parallel with the spiral surface 62. There is a gap S3 between the upper surface of the second winding portion T2 and a portion of the lower surface of the protrusion 64, which is at the same position as the start portion 63 in the plan view. The first winding portion T1 is fitted to the spiral surface 62 such that the upper winding end 50*a* of the coil spring 50 contacts the start portion 63. Each of the first winding portion T1 and the lower-end winding portion is used as a supported portion that is supported by the support member 61. When the coil spring unit 60 is used, the valve element 34 is fitted in the hollow portion 61*b* that extends from the top to the bottom of the support member 61. The valve element 34 may be integrally formed on the upper surface of the support member 61. With this configuration, it is possible to reduce the number of components, and the number of man-hours required in an assembly process.

In this embodiment, the position of each of the upper and lower effective winding ends is the position of the border between the region of the coil spring 50 that closely contacts the spiral surface 62 and the region of the coil spring 50 that does not closely contact the spiral surface 62, that is, the position shown by the arrow Z in FIG. 11. That is, in this embodiment, the positions of the effective upper and lower winding ends Z are offset from each other by 180 degrees in the plan view. As a result, a gap S3 is formed at the position of the effective upper winding end Z as shown in FIG. 11, and at the position, which is offset from the effective upper winding end Z by 180 degrees in the plan view, of the effective lower winding end, a gap is formed. Thus, even if the coil spring 50 is deformed when the valve element 34 is operated, the adjacent winding portions between the effective upper and lower winding ends do not contact each other, and the positions of the effective upper and lower winding ends are not moved. Therefore, it is possible to obtain the desired effect of accurately adjusting the pressure of the fuel. In this embodiment, the upper winding end 50*a* and the lower winding end (not shown) may be, or may not be offset from each other by 180 degrees in the plan view.

Figure 13:
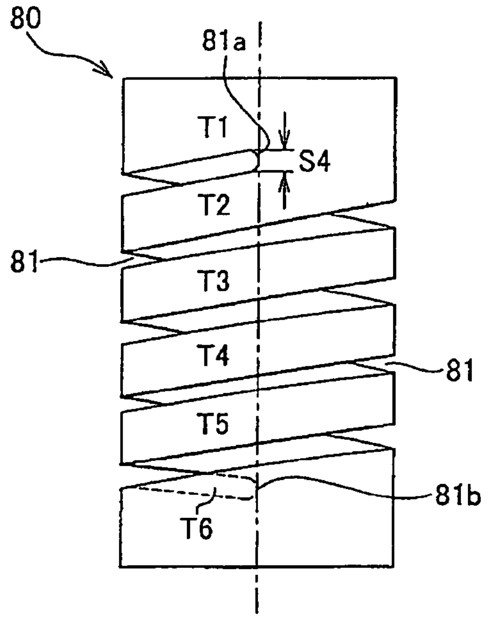
FIG. 13 is a front view of another coil spring according to the invention, in which effective upper and lower winding ends are offset from each other by 180 degrees.

FIG. 13 shows a fifth embodiment in which a coil spring 80 is formed using a spring steel pipe. The coil spring 80 is formed by forming a spiral opening 81 on the spring steel pipe that has a cylindrical shape. The spiral opening 81 has a constant pitch. The coil spring 80 includes the first winding portion T1 that is the turn-end, the second winding portion T2, the third winding portion T3, the fourth winding portion T4, the fifth winding portion T5, and the sixth winding portion T6 that is the turn-end, in the direction from the upper portion to the lower portion of the coil spring 80. When the coil spring 80 is used, the valve element 34 is fitted in an opening that extends from the top to the bottom of the coil spring 80. The valve element 34 may be integrally formed on the upper surface of the coil spring 80.

In this embodiment, the coil spring 80 is the open-end constant-pitch spring. The positions of the effective upper and lower winding ends are the positions of the upper end 81*a* and the lower end 81*b* of the spiral opening 81 shown in FIG. 13. In this embodiment, the positions of the upper end 81*a* and the lower end 81*b* are offset from each other by 180 degrees in the plan view. As a results a gap S4 is formed at the position of the upper end 81*a*, as shown in FIG. 13, and at the position of the lower end 81*b*. Thus, even if the coil spring 80 is deformed when the valve element 34 is operated, the adjacent winding portions between the effective upper and lower winding ends do not contact each other, and the positions of the effective upper and lower winding ends are not moved. Therefore, it is possible to obtain the desired effect of accurately adjusting the pressure of the fuel.

Figure 14A:
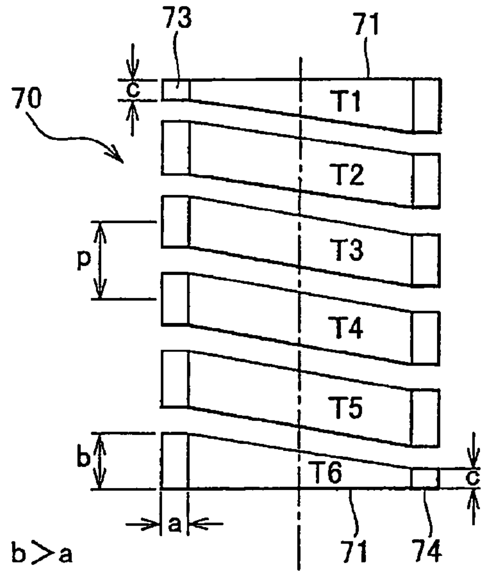
FIG. 14A and FIG. 14B are a cross sectional view and a front view of another coil spring according to the invention, in which effective upper and lower winding ends are offset from each other by 180 degrees.
Figure 14B:
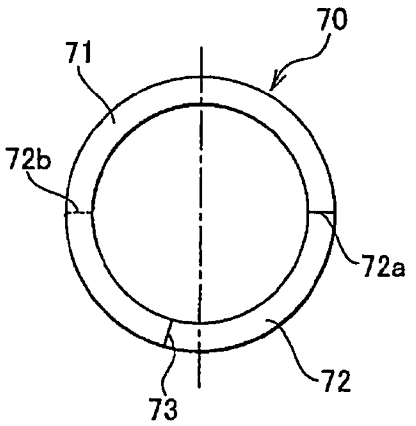

FIGS. 14A and 14B show a sixth embodiment in which a coil spring 70 is used. The coil spring 70 is the so-called open-end constant-pitch spring. In the coil spring 70, a horizontal flat surface portion 71 is formed on the upper surface of the first winding portion T1 that is the turn-end. The horizontal flat surface portion 71 is also formed on the lower surface of the sixth winding portion T6 that is the turn-end. The coil spring 70 has a rectangular cross section. The coil spring 70 satisfies the equations, b>a, and b≧(⅝) p, wherein “b” represents the length of the coil spring 70 in the axial direction, “a” represents the length of the coil spring 70 in the radial direction, and “p” represents the pitch. The flat surface portion 71 is formed in the range of at least 225 degrees on the upper surface of the first winding portion T1. The flat surface portion 71 may be formed in any range, as long as the axis of the valve element 34 is not inclined when the valve element 34 is operated. For example, the flat surface portion 71 may be formed in the range of at least 180 degrees. However, it is preferable to form the flat surface portion 71 in the range of at least 225 degrees to ensure the stability of the valve element 34. The range in which the flat surface portion is formed may be applied to each of the above-described embodiments.

In this embodiment, the effective upper winding end is an inclination start portion 72*a* that is the border between the horizontal flat surface portion 71 of the first winding portion T1, on which the valve element 34 is placed, and an inclination portion 72 that is continuous with the flat surface portion 71. The effective lower winding end is an inclination start portion 72*b* that is the border between the horizontal flat surface portion 71 of the sixth winding portion T6, which contacts the spring bearing portion 33, and the inclination portion 72 that is continuous with the flat surface portion 71. The coil spring 70 is formed such that the inclination start portions 72*a* and 72*b* are offset from each other by 180 degrees.

In this embodiment, the flat surface portion 71 and the inclination portion 72 are continuous with each other. That is, means for forming a space is not used in this embodiment, unlike the embodiments shown in FIGS. 8, 9, 11, and 13. Therefore, there may be concern that the inclination start portions 72*a* and 72*b* may be moved when the valve element 34 is operated, as described with reference to FIGS. 15A to 15C. However, because the coil spring 70 used in the embodiment is the so-called open-end constant-pitch spring, a wide angle θ is maintained between the first winding portion T1 and the second winding portion T2, as shown in FIG. 15E, even when the valve element 34 is operated. Thus, when the valve element 34 is operated, the inclination start portions 72*a* and 72*b* are not moved, and the positions of the effective upper and lower winding ends are not moved. In this embodiment, the coil spring 70 has a rectangular cross section. However, the coil spring 70 may have, for example, an oval cross section.

The invention is not limited to the configurations in the above-described embodiments. The design may be appropriately changed in the scope of the invention. For example, the valve element that has a sphere shape, a flat shape, or an arc shape may be used. Also, the pressure adjusting valve may be used not only for a vehicle, but also for the other applications.

What is claimed is:

1. A valve comprising:

a valve element;

a valve seat;

a coil spring; and a spring bearing portion, wherein the coil spring, provided between the valve element and the spring bearing portion, presses the valve element toward the valve seat, wherein the coil spring has an effective winding region that bends when an axial load is applied to the coil spring, the effective winding region being between an effective upper winding end, which is a point in an upper portion of the coil spring at which an axial direction rigidity of the upper portion of the coil spring is largest, and an effective lower winding end, which is a point in a lower portion of the coil spring at which the axial direction rigidity of the lower portion of the coil spring is largest, and the effective upper winding end of the coil spring, and the effective lower winding end of the coil spring being offset from each other by 180 degrees in a plan view.

2. The valve according to claim 1, wherein:

when the valve element is moved in a movement range, adjacent winding portions of the coil spring do not contact each other.

3. The valve according to claim 1, wherein:

the upper portion of the coil spring includes a first winding portion that contacts the valve element, a second winding portion that is continuous with the first winding portion; and the lower portion of the coil spring includes a third winding portion that contacts the spring bearing portion, and a fourth winding portion that is continuous with the third winding portion; and when the valve element is moved in the movement range, positions of the effective upper winding end and the effective lower winding end are maintained by disposing the first winding portion and the second winding portion such that the first winding portion and the second winding portion do not contact each other, and by disposing the third winding portion, and the fourth winding portion such that the third winding portion and the fourth winding portion do not contact each other.

4. The valve according to claim 3, further comprising a first spacer disposed between the first winding portion and the second winding portion.

5. The valve according to claim 3, further comprising a second spacer disposed between the third winding portion and the fourth winding portion.

6. The valve according to claim 1, wherein:

the upper portion of the coil spring includes a first winding portion that contacts the valve element, a second winding portion that is continuous with the first winding portion; and the lower portion includes a third winding portion that contacts the spring bearing portion, and a fourth winding portion that is continuous with the third winding portion; and the first winding portion and the second winding portion are disposed such that a clearance between the first winding portion and the second winding portion is maintained when the valve element is moved in a movement range, and the third winding portion and the fourth winding portion are disposed such that a clearance between the third winding portion and the fourth winding portion is maintained when the valve element is moved in the movement range.

7. The valve according to claim 6, further comprising a first spacer disposed between the first winding portion and the second winding portion.

8. The valve according to claim 6, further comprising a second spacer disposed between the third winding portion and the fourth winding portion.

9. The valve according to claim 1, wherein:

the coil spring is an open-end constant-pitch spring that is attached to an upper support member at an upper-end winding portion of the open-end constant-pitch spring, and that is attached to a lower support member at a lower-end winding portion of the open-end constant-pitch spring;

the upper support member and the lower support member are opposite to each other through the open-end constant-pitch spring;

a first spiral surface is formed on a surface of the upper support member, and a corresponding spiral surface is formed on a surface of the lower support member, the surface of the upper support member and the surface of the lower support member being opposite to each other;

a side face formed in the upper support member extends from a start portion of the first spiral surface of the upper support member in an axial direction of the coil spring by a distance equal to the pitch of the open-end constant-pitch spring;

a corresponding side face formed in the lower support member extends from a start portion of the corresponding first spiral surface of the lower support member in the axial direction of the coil spring by a distance equal to the pitch of the open-end constant-pitch spring; and the first spiral surface of the upper support member receives the upper-end winding portion of the open-end constant-pitch spring, and the corresponding first spiral surface of the lower support member receives the lower-end winding portion of the open-end constant-pitch spring.

10. The valve according to claim 9, wherein:

a second spiral surface is formed in the upper support member that extends parallel with the corresponding first spiral surface of the upper support member, and a distance shorter than the pitch of the open-end constant-pitch spring separates the second spiral surface and the first spiral surface; and a corresponding second spiral surface is formed in the lower support member that extends parallel with the corresponding first spiral surface of the lower support member, and the corresponding second spiral surface is separated from the lower spiral surface by a distance shorter than the pitch of the open-end constant-pitch spring.

11. The valve according to claim 1, where the coil spring is an open-end constant-pitch spring that has a rectangular cross section that has a long side extending in an axial direction of the coil spring, and a short side extending in a radial direction of the coil spring, and a flat surface portion is formed in each of the upper-end winding portion and the lower-end winding portion.

12. The valve according to claim 1, wherein the coil spring is formed by forming a spiral opening that has a constant pitch on an outer periphery of a spring steel pipe.

13. The valve according to claim 1, further comprising:

a case, in which the valve element is disposed; and a fluid passage formed in the case through which fluid is delivered from a tank by a pump, wherein the valve element contacts the valve seat to close the passage when a pressure of the fluid in the passage is below a predetermined value, and the valve is moved away from the valve seat to open the passage when the pressure of the fluid is above the predetermined value.

14. A vehicle fuel system, comprising:

the valve according to claim 1.

15. The valve according to claim 1, wherein a diameter of the coil spring is constant from the effective upper winding end of the coil spring to the effective lower winding end of the coil spring.

16. The valve according to claim 1, wherein a diameter of a first winding portion of the coil spring, which includes the effective upper winding end, is approximately the same as a diameter of a second winding portion of the coil spring, which includes the effective lower winding end.

* * * * *